United States Patent [19]

Makay et al.

[11] 4,156,113

[45] May 22, 1979

[54] PROGRAMMABLE DATA PROCESSOR FOR USE IN SMALL AND MEDIUM-SIZE SWITCHING SYSTEMS, ESPECIALLY IN TELEPHONE EXCHANGES

[75] Inventors: Attila Makay; Pál Molnár; János Haffner; Dezsö Balogh, all of Budapest, Hungary

[73] Assignee: BHG Hiradastechnikai Vallalat, Budapest, Hungary

[21] Appl. No.: 841,566

[22] Filed: Oct. 12, 1977

[30] Foreign Application Priority Data

Oct. 13, 1976 [HU] Hungary .............................. BE 1273

[51] Int. Cl.$^2$ ............................................. H04Q 3/54
[52] U.S. Cl. ................................................. 179/18 ES
[58] Field of Search .................................... 179/18 ES

[56] References Cited

U.S. PATENT DOCUMENTS

| | | | |
|---|---|---|---|
| 3,497,630 | 2/1970 | Lucas et al. ...................... | 179/18 ES |
| 3,582,896 | 6/1971 | Silber ............................ | 179/18 ES X |
| 3,665,510 | 5/1972 | Brandt et al. ................. | 179/18 ES X |
| 3,775,754 | 11/1973 | Auspurg et al. ............. | 179/18 ES X |
| 3,965,458 | 6/1976 | Borbas et al. ................. | 364/200 |

*Primary Examiner*—Thomas W. Brown
*Attorney, Agent, or Firm*—Karl F. Ross

[57] ABSTRACT

A data processor for a telecommunication system comprises a program and data memory ME controlled by a block MEV including address registers C1, C2, an address store ACT and an instruction counter US, the memory exchanging information with the components of block MEV and with a set of working registers REG via a reading bus $l_{rl}$ and a writing bus $l_w$; another reading bus $l_{r2}$ interlinks some of the aforementioned components. An associated execution unit includes an instruction register U divided into two sections MR and UR receiving instruction words from the writing bus, these words consisting of a group of operand bits fed from section UR to a microprogrammed command-signal generator MV and a group of transformation bits fed from section MR to an address store MC. The signal generator MV emits commands for the transfer of addresses from block MEV to memory ME as well as for the readout of data from that memory to an arithmetical unit ALU also receiving data from registers REG, unit ALU being controlled by the contents of store MC; the latter is divided into a plurality of fields all containing the same number of operating instructions (here four) selectable by the transformation bits from register section MR while the field is identified by a bit group received from signal generator MV. Instruction counter US includes two counting registers, P1, P2 connected in parallel between the writing bus $l_w$ and the reading bus $l_{rl}$, the first counting register P1 being stepped by commands from generator MV and having another output which works under the control of that generator into a counting input of the second counting register P2 also having an output connection to the internal bus $l_{r2}$. Address store ACT includes two data-page registers Y1, Y2 with inputs connected to the writing bus $l_w$ and outputs connectable in a predetermined sequence, via a switching network $Y_K$, to the internal bus $l_{r2}$.

7 Claims, 2 Drawing Figures

PROGRAMMABLE DATA PROCESSOR FOR USE IN SMALL AND MEDIUM-SIZE SWITCHING SYSTEMS, ESPECIALLY IN TELEPHONE EXCHANGES

FIELD OF THE INVENTION

Our present invention relates to a programmable data processor for use in switching systems of small and medium-size centers, particularly in telephone exchanges.

BACKGROUND OF THE INVENTION

Different types of programmable data processors for telephone exchanges are known from the literature including various patent specifications such as German Pat. Nos. 1,914,578 (Siemens), 1,549,550 (Ericsson), and 1,474,097 (Western Electric). Owing to economic considerations these known processors are used mostly in larger switching systems with several thousand subscriber lines or with a load equivalent to such a number of lines. The use of controlled switching based on stored programs in smaller exchanges is still a matter in dispute, mainly on account of the high costs of the control system itself.

Programmable data processors comprise generally a memory, means for storing and transferring data for addressing the memory, a set of working registers including an input-output coupler storing the internal operational data of the processor and establishing a connection towards the peripheral units, and an instruction-executing component including typically an instruction register, a (mostly microprogrammed) control block and an arithmetical and logic unit.

The memory serves for storing the programs required for the operation of the controlled switching unit, along with data including those relating to the operational states of the lines and of the circuits of an associated interface unit. The required capacity of the memory for storing the program and the various data is in first approximation identical in case of all larger centers (see for instance the systems AKE or AXE of the Company Ericsson). In smaller switching systems the amount of data to be processed decreases substantially proportionally to the size of the exchange; however, the number of programs defining the controlling algorithms can decrease only if the associated functions also become simpler. The basic functions in telephone technology are identical in larger and smaller exchanges. Thus, for switching units of smaller size the memory capacity is defined essentially by the size of the program store. Given a predetermined set of algorithms and programmable ability, the size of that store depends mostly on the machine-coded programming language which is determined by the structural design of the processor. Thus, an improved design of the processor may significantly reduce the size of the program store.

OBJECTS OF THE INVENTION

An important object of our present invention is to provide a stored-program-controlled data processor for smaller and medium-size exchanges whose economical efficiency is comparable to that of the larger systems. Another object is to provide such a processor with control means enabling the use of programs for the realization of the control functions required for telephone exchanges with the smallest possible storage requirements combined with optimum layout of its hardware.

SUMMARY OF THE INVENTION

In order to realize these objects, we took note of the fact that the structural design of the processor is rational if it makes use of the special properties of the typical data and progam structures (algorithms) characteristic of the given field of application. In case of telephone exchanges the following basic and essential feature can be recognized in the algorithms and data structures describing the controlling functions:

The control system of the whole telephone exchange or an independent part thereof consists of a comparatively great number of subroutines which are interconnected like the links of a chain. A typical feature of such subroutines is that they carry out various transformations on the elements of a data file or store containing functionally related data, often with follow-up examination of elementary logical relationship resulting in a modification of certain elements of the file. In particular cases comparatively short decisive sequences are generated; in view of the possible wide variety of the elements themselves, however, a large number of different results may come out. Thus, the subroutines are composed of several shorter and net-like branched parallel decision loops. These branchings terminate in most cases within the respective subroutine, a reference to other external subroutines occurring relatively rarely. The same is true for the data file, too, since references to other data files occur also rarely and, if so, only in a temporary character, which means that any reference by a subroutine to an outside data file is eventually followed by a return to the elements of its own file. The "outside" data files are in most cases in the form of a common table or of a read-only memory from which the required data can be read out, whereafter the subroutines continue the processing of their own data.

The above-mentioned considerations can be applied to the handling of program and data addresses so that the length of programs prepared according to this principle should be essentially less than if they were made in the machine language of any general-purpose processor. This necessitates, however, that the instruction system of the special processor designed for this method should operate on the same level of expressivity as the general-purpose processor referred to above for comparison. The "expressivity" of an instruction set is characterized mostly by the number of machine instructions. Obviously, if the number of machine instructions is increased, the "expressivity" will be better, i. e. the instruction set can be used for making shorter and more concise programs. It should also be understood that the increased expressivity is associated with a more complicated instruction-executing unit in the processor with a greater hardware requirement than if a smaller number of machine instructions were realized. If, for instance, the execution of the instructions is microprogrammed, then the operational code of an instruction defines, as is known, the starting address of the microprogram of this instruction in the microprogram store on the basis of the content of the starting-address store. From this it follows that the capacity both of the microprogram store and of the starting-address store is proportional to the greatest number which can be expressed by the operational code. If it is possible to find an operational code in a form that enables a certain kind of parallelism (which means that the control signals required for the execution of the instruction are generated simultaneously by respective units controlled by separate bit groups of the operational code), then the capacity of the aforesaid stores and the volume of the associated decoder and other circuits can be considerably reduced. The theoretical possibility of making such a code is given with applications in the field of telephone-technology in which the most frequently occurring specific instruction and operation types can be recognized and used for rationalization. As was mentioned before, the most common task in control processes is the logical analysis of data files which is followed by the performance of logical-arithmetical operations on predetermined elements of the file. Thus, almost every one of the elementary operations (instructions) which are to be performed can be related not only to one but to a plurality of logical-arithmetical operations.

If most of the instructions (more than 80%) are of this type, a bit group in the operational code can be used for designating the operation and can be treated separately, which means that only the remaining bit group is required for the control of the microprogrammed control block. Effectively, this is as if the number of instructions were reduced. The actual number of instructions is determined, however, by the full length of the operational code; this establishes the significance of the "expressivity" which has a great influence on the capacity of the program store.

The reduction of the program-storing capacity saves much more than memory costs. This cost reduction becomes unimportant compared to the savings connected with maintainance (e.g. fault detection) and with the further utilization of the processor time made available by the shorter running time due to the shorter programs. It is known that in the program system of conventional switching systems, controlled by stored programs, the proportion of the actual controlling programs amounts to about 30–40% while the remaining part is required for the handling of the complicated and voluminous software, as well as for accommodating the specific operational system required for the performance of the operational, supervisory, reserve and fault-detection functions. A significant part of the high cost of the control system stems from these factors. Though in the case of medium-size exchanges the amount of this additional software can be substantially reduced by using other ways of control (e.g. by a decentralized control system), the remaining part will essentially depend on the volume of the local control programs.

In accordance with an important feature of our invention, we provide a special register for the temporary storage of multibit instruction words read out during successive program cycles, in the usual manner, from a memory under the control of an instruction decoder and generator of command signals controlling the transfer of data among the several components of the data processor. The instruction register is divided into a first and a second section respectively receiving a basic bit group and a transformation code forming part of the instruction word, only the basic bit group being forwarded to the command-signal generator whereas the transformation code is delivered to an operational-address store working into a conventional arithmetical and logic unit for the performance of selected algebraic or logical operations on data fed into that unit from the memory and possibly from an associated working register. The operational-address store is divided into a plurality of fields, each containing as many operating instructions as there are bit combinations in the transformation code, which are selectively identified by a further bit group emitted by the command-signal generator in response to the basic bit group concurrently transmitted thereto.

This arrangement enables a considerable reduction in the volume of the microprogram store associated with the command-signal generator, compared with that which would be required if this signal generator had to decode the bit combinations of the complete instruction word.

BRIEF DESCRIPTION OF THE DRAWING

The above and other features of our invention will now be described in detail with reference to the accompanying drawing in which.

SPECIFIC DESCRIPTION

Figure 1:
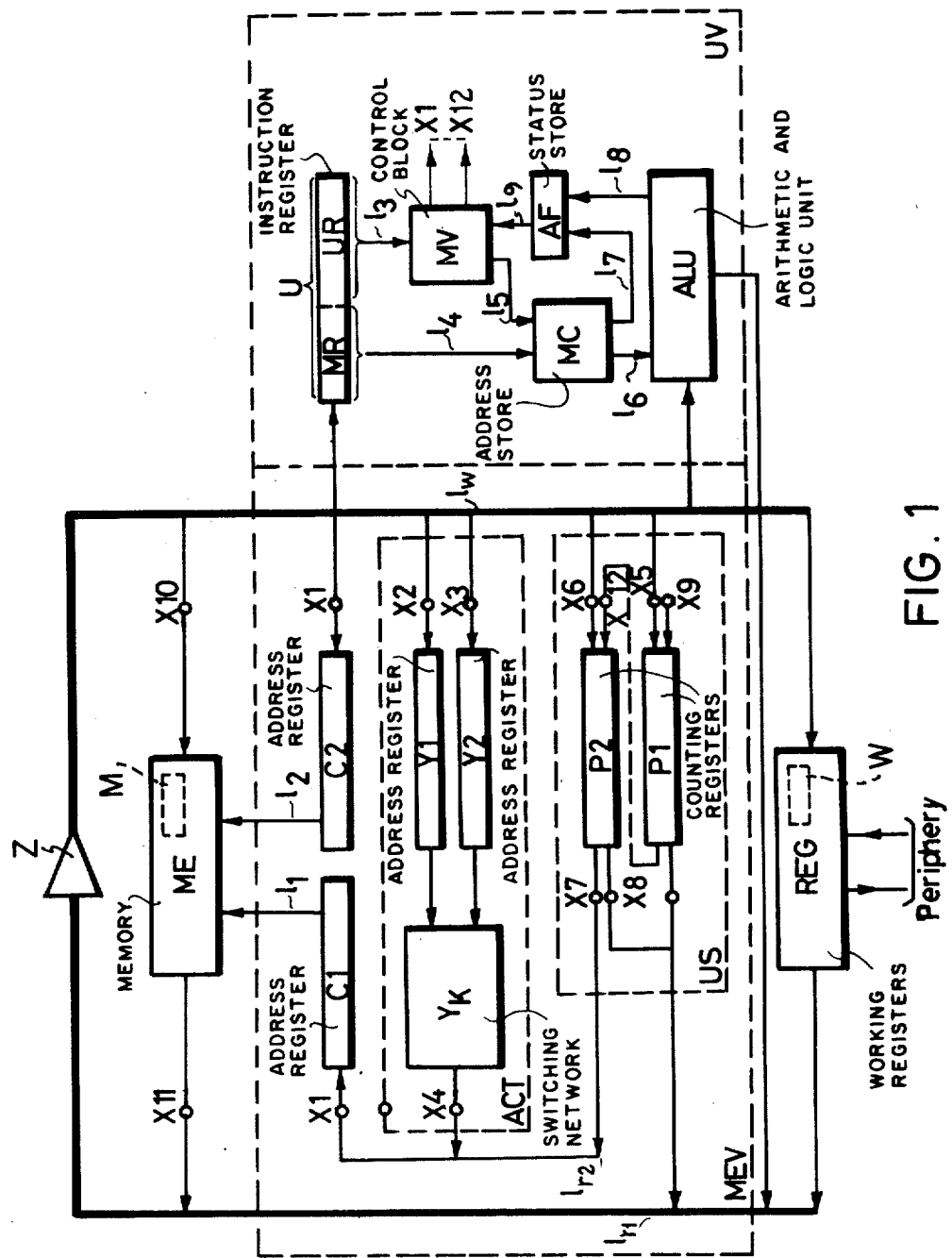
FIG. 1 shows the general block diagram of a data processor according to the invention.
Figure 2:
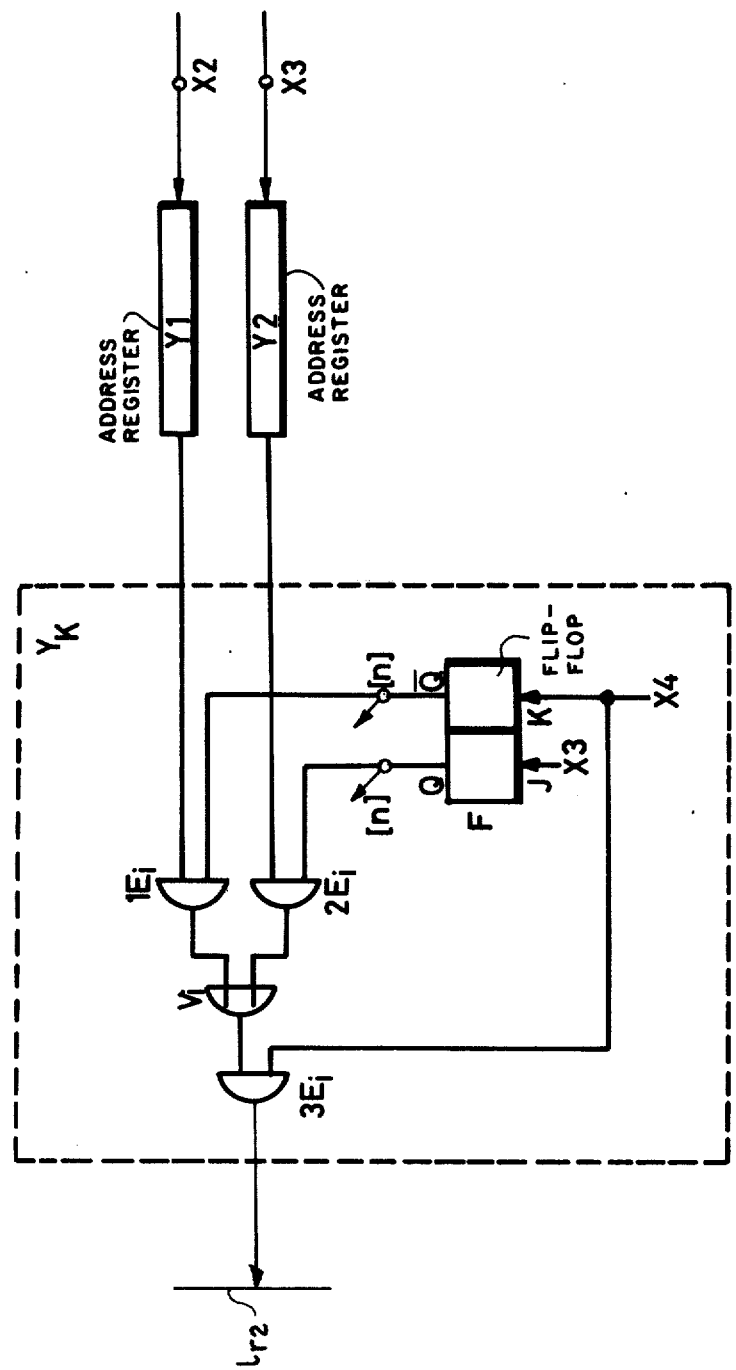
FIG. 2 is a detailed circuit diagram of a switching network shown is block form in FIG. 1.

A programmable data processor according to our invention, adapted to be used in small and medium-size switching systems, is shown in FIG. 1 and comprises a program and data memory ME, a memory-control block MEV having a first address register C1 and a second address register C2 connected via respective first and second line multiples $l_1$ and $l_2$ to the address inputs of memory ME, an instruction counter US, and a data-page-address store ACT. This data processor further comprises a working-register unit REG, exchanging data with nonillustrated peripheral units, and an instruction-executing component UV, the latter including an instruction register U, a microprogrammed control block MV acting as an instruction decoder and generator of command signals, an operational-address store MC, an arithmetical and logic unit ALU and an internal-status store AF. The store ACT comprises a first data-page-address register Y1, a second data-page-address register Y2 and a switching network $Y_K$ (FIG. 2).

Control block MV has a multiplicity of outputs X1–X12 which, in response to operand codes received via a line multiple $l_3$ from register U, are selectively energizable to command various transfer operations among the cells of memory ME, the registers of unit REG and the components of block MEV, as schematically indicated by small circles within the rectangular area encompassed by a reading bus $l_{r1}$ and a writing bus $l_w$ which are interconnected by an amplifier Z. Command line X1 controls the loading of register C2 from writing bus $l_w$ and of register C1 from another internal reading bus $l_{r2}$. Command lines X2 and X3 respectively control the loading of registers Y1 and Y2 from writing bus $l_w$. Command line X4 controls the readout of either of these latter registers, as more fully described hereinafter, into bus $l_{r2}$ via switching network $Y_K$. Address store ACT comprises two counting registers P1 and P2 with writing inputs connected for parallel loading to bus $l_w$ and controlled by command lines X5 and X6, respectively. The two counting registers have interconnected outputs extending to bus $l_{r1}$ for parallel readout under the control of command line X8. A second output of register P1, controlled by command line X12, is connected to a counting input of register P2 which has a second output controlled by command line X7 and connected to bus $l_{r2}$. A counting input of register P1 is connected to command line X9. Memory ME has input and output leads, respectively connected to writing bus $l_W$ and reading bus $l_{r1}$, controlled by command lines X10 and X11.

The above-described arrangement enables the loading of the first counter register P1 independently from the second counter register P2 so that within a program page the transfer instructions can be executed by means of a single operand in lieu of two operands as would otherwise be necessary. This simplification results also in a significant program-store reduction, since the definition of the telephone functions requires the use of several transfer instructions.

Instruction register U, containing only operational codes, has an input connection to writing bus $l_w$ but no output connections to either of the internal data buses $l_{r1}$, $l_{r2}$. This register is divided into two sections, i.e. a right-hand section UR working into control block MV via the aforementioned line multiple $l_3$ and a left-hand section MR working into address store MC by way of another line multiple $l_4$. Block MV also has an output multiple $l_5$ leading to store MC whose output multiples $l_6$ and $l_7$ respectively extend to arithmetic unit ALU and to status store AF, the latter feeding back information to block MV via a connection $l_9$. Unit ALU, which is of conventional design, works into reading bus $l_{r1}$.

In FIG. 2 we have illustrated details of the switching network $Y_K$ forming part of the data-page-address store ACT. This network comprises a first set of AND gates $1E_i$ with inputs connected to address register Y1, a second set of AND gates $2E_i$ with input connections to address register Y2, and a third set of AND gates $3E_i$ with inputs connected by way of a set of OR gates $V_i$ to the outputs of AND gates $1E_i$ and $2E_i$, the gates of each set being schematically represented by a single gate. A flip-flop F of the J/K type has its setting input J connected to command line X3 and its resetting input K connected to command line X4, the latter also extending to other inputs of AND gates $3E_i$. The set and reset outputs Q and $\overline{Q}$ of flip-flop F are connected by n-lead multiples to the remaining inputs of AND gates $1E_i$ and $2E_i$. The output leads of AND gates $3E_i$ terminate at bus $l_{r2}$.

It will be apparent that, if register Y2 has not been loaded by a command signal on line X3, flip-flop F will be in its reset state so that AND gates $1E_i$ are unblocked. Upon the next energization of command line X4 in response to a memory-reference instruction present in register U, therefore, the data-page addresses written in register Y1 will be read out to bus $l_{r2}$ via the cascaded gates $1E_i$, $V_i$ and $3E_i$. If, however, register Y2 has been loaded in the interim, flip-flop F has been set by the energization of command line X3 so that AND gates $2E_1$ are unblocked in lieu of gates $1E_i$. Upon the occurrence of a transfer command on line X4, therefore, the addresses in register Y2 will be read out first even as flip-flop F is being reset by the same command signal whereby the addresses in register Y1 are read out next. Thus, the system returns automatically to the data block associated with register Y1 after a transitory switchover to another data block associated with register Y2.

In a specific instance, the instruction register U contains eight bits; its left-hand section MR accommodates two bits and its right-hand section UR accommodates six bits. Thus, the fourth line multiple $l_4$ consists of only two lines and the third line multiple $l_3$ has six lines. The microprogrammed control block MV should distinguish $2^6 = 64$ different positions, although the instruction register U is apt to define altogether $2^8 = 256$ different instructions. Each coded value stored in the right-hand register section UR working into the microprogrammed control block MV is associated with four bit combinations stored in the left-hand register section MR; these four bit combinations constitute a transformation code which can define four different algebraic or logical operations. Among these possible operations the machine performs, during execution of the "basic instructions" determined by the contents of register section UR, always that one which is determined by the actual value of the bit group present in register section MR. Let these four instructions (which are associated with a common "basic instruction" be as follows:

ADD [W, M]
AND [W, M]
OR [W, M]
ANT [W, M]

According to these instructions, relating to the contents of a general-purpose register W of unit REG and of a memory cell M defined by the operand of the instruction, the arithmetical addition "ADD," the logical "AND" and "OR" functions and the ANTIVALENCE operation "ANT" should be carried out in sequence by unit ALU, and the result should be stored in said register W to which unit ALU is connected via reading bus $l_{rl}$, amplifier Z and writing bus $l_W$. It can be seen that the execution of these instructions differs in the respective cases only in the step regarding the required operation. This means that the microprogrammed block MV can control these four instructions identically, i.e. at the moment of the execution of the required operation the proper enabling of the lines $l_5$ select a quadruple address field of the operational-address store MC and the momentary states of the lines $l_4$ define the operational address associated with one of those four operations. The information found in the store MC at this address activates, through the line multiple $l_6$ the unit ALU for the performance of the required operation, reported back to block MV via multiples $l_7$, $l_8$, store AF and line $l_9$.

Another instruction group is for instance:
INR [M]
DCR [M]
ROT [M]
ZRO [M]

These instructions, which modify the content of the memory cell M defined as described above, are: "add 1" (incrementation INR), "substract 1"0 (decrementation DCR), rotation (ROT) and zeroing (ZRO). Now the micro-programmed control block MV uses the lines $l_5$ to select another quadruple address field in the address store MC in which the information for designating the last-mentioned operations is stored. In the described embodiment the line multiple $l_5$ consists of three lines whereby eight different groups of operations can be associated with the sixty-four basic instructions. These groups may comprise the respective operations several times; the total number of operations can therefore be smaller than $8 \times 4 = 32$.

In the two described typical instruction groups the basic instruction in register section UR defines the operands (e.g. M, W) participating in the data transformation or transfer while the operational differences among the particular instructions are represented by the transformation code in section MR. This method can be used, however, not only in case of logical and arithmetical transformations but also for instance to assign the different types of transfer instructions to one and the same basic instruction. For example, in the case of instructions JF (unconditioned jump)
JFI (conditional jump if A is true)
JFO (conditional jump if A is false)
JFF (conditional jump if B is true)

the operational-address store MC selects through the lines $l_7$ that particular line of the multiple $l_8$ whose signal, when transferred to the line $l_9$, enables or inhibits the actual execution of the data transfer (e.g. the loading of the counting register P1 or P2) required during the execution of the transfer instruction with the aid of the micro-programmed control block MV. Thus, the unconditional transfer can be realized by a line of multiple $l_8$ connected permanently to a logical YES level.

Our improved data processor described above can substantially reduced the volume of the microprogrammed control block compared to that of conventional ones in which the operational-code section of the instruction register does not comprise a distinctly separated code field for the identification of the arithmetical, logical or other operations to be performed but in which the microprogrammed control block itself interprets these operations.

What we claim is:

1. In a data processor for a telecommunication system, including a program and data memory containing a series of multibit instruction words, working-register means in communication with peripheral units, storage means connected to address inputs of said memory, a signal generator responsive to instruction words read out from said memory for controlling the transfer of data among said memory, said working-register means and said storage means, and an arithmetical and logic unit connected to said memory and to said working-register means for performing algebraic and logical operations on data received therefrom, the combination therewith of an instruction register divided into a first section and a second section respectively accommodating a first bit group and a second bit group of an instruction word received from said memory, said signal generator having input connections only to said first section for receiving said first bit group from said instruction register, and an address store with input connections to said second section and to said signal generator for receiving said second bit group from said instruction register and a further bit group from said signal generator, said further bit group being derived from said first bit group and identifying one of several fields in said address store each containing a plurality of operating instructions for said arithmetical and logic unit individually selectable by said second bit group, said arithmetical and logic unit having input connections to said address store for receiving said operating instructions therefrom.

2. The combination defined in claim 1, further comprising a feedback connection from said address store to said signal generator, said arithmetical and logical unit having an output multiple extending to said feedback connection for selectively authorizing jump operations in dependence upon said operating instructions.

3. The combination defined in claim 1 wherein said memory, said working-register means and said arithmetical and logic unit have inputs interconnected by a writing bus and have outputs interconnected by a first reading bus, further comprising instruction-counting means with input connections to said writing bus and with output connections to said first reading bus and to a second reading bus extending to said storage means.

4. The combination defined in claim 3 wherein said storage means comprises a first data register and a second data register with inputs connected to said writing bus for loading from respective data blocks under the control of said signal generator, and switching means inserted between said second reading bus and outputs of said data registers, said switching means connecting said first data register in a normal state to said second reading bus and being operable by command signals from said signal generator to establish a temporary connection from said second data register to said second reading bus with automatic return to the normal state.

5. The combination defined in claim 4 wherein said switching means comprises a flip-flop settable by a signal commanding the loading of said first data register and resettable by a signal commanding the readout of either of said data registers.

6. The combination defined in claim 3 wherein said instruction-counting means comprises a first counting register and a second counting register with writing inputs connected to said writing bus and with interconnected outputs joined to said first reading bus, said first counting register having a further output connected to a counting input of said second counting register, the latter having a further output connected to said second reading bus, all said inputs and outputs of said counting registers being controlled by command signals from said signal generator.

7. The combination defined in claim 1 wherein said first, second and further bit groups consist of six, two and three bits, respectively.

* * * * *